United States Patent [19]
Merkle

[11] 3,841,694
[45] Oct. 15, 1974

[54] VEHICLE CAB MOUNTING MEANS
[75] Inventor: Ralph H. Merkle, Brighton, Mich.
[73] Assignee: General Motors Corporation, Detroit, Mich.
[22] Filed: Nov. 1, 1973
[21] Appl. No.: 411,662

[52] U.S. Cl....... 296/35 R, 280/106.5 R, 267/65 D,
[51] Int. Cl............................................. B62d 27/04
[58] Field of Search ..... 280/106.5 R, 124 F, 405 A; 180/89 R, 267/65 R, 65 D; 296/35 R

[56] References Cited
UNITED STATES PATENTS
3,177,032   4/1965   Jaskowiak ......................... 296/35 R
3,420,568   1/1969   Henriksson ................... 280/106.5 R
3,554,596   1/1971   LeFevre ............................ 296/35 R Primary Examiner—Philip Goodman
Assistant Examiner—John A. Carroll
Attorney, Agent, or Firm—Edward J. Biskup

[57] ABSTRACT

A mounting means located at the rear end of a vehicle cab that includes an adjustable air spring arrangement for cushioning vibrations and shock loads transmitted from the vehicle frame to the cab.

3 Claims, 4 Drawing Figures

PATENTED OCT 15 1974

3,841,694

VEHICLE CAB MOUNTING MEANS

This invention concerns a motor vehicle mounting means and more particularly a unique air spring mounting for the rear portion of a vehicle cab for cushioning the shocks and vibrations transmitted from the chassis to the cab.

Present day trucks are provided with a chassis frame which is relatively flexible so it can bend and thereby relieve the torsional forces normally imposed upon the frame. As a consequence, the chassis frame is capable of withstanding relatively high forces when the truck travels on long hauls under different load conditions and varying speeds without any damage to the frame. As is well known, however, the bending of the frame as well as the heavy duty suspension employed with trucks causes vibrations and shock loads to be transmitted to the vehicle cab which under certain operating conditions could be most pronounced at the rear of the cab.

Accordingly, the objects of the invention are to provide an improved spring support for the rear end of a truck cab which together with a pair of transversely spaced front supports cushions relative movement between the cab and the truck frame; to provide a mounting located at the rear end of a truck cab that includes a plurality of circumferentially spaced air springs located in a transverse plane for minimizing the vibrations and shock loads transmitted from the chassis to the cab; to provide an adjustable air suspension for the central rear end of a truck cab that includes three air springs for cushioning sidewise and vertical movement of the cab; and to provide a plurality of air-filled springs for the rear end of a truck cab that are connected with a control system that maintains the rear portion of the cab at a constant height relative to the frame while permitting the vehicle operator to select optimum ride by manually causing air to flow to or from one of the air springs.

The above objects and others are realized in accordance with the invention by a mounting device which connects the central rear end of a truck cab to the frame and which, in general, comprises three circumferentially spaced air springs located in a transverse plane. The rear of the cab rigidly carries a first bracket member having a triangularly shaped block member supporting the inner end of the air springs. A second bracket is rigidly secured to the frame and together with the frame provides support surfaces for the outer end of the air springs in a manner whereby the latter are securely held in position between the first and second brackets and serve to cushion relative movement between the truck cab and frame. In addition, means are provided for selectively inflating or deflating one of the air springs and automatically controlling the air pressure in the other air springs so the vehicle operator can vary the stiffness of the springs and thereby choose the ride which is most comfortable for him.

Other objects and advantages of the present invention will be apparent from the following detailed description when taken with the drawings in which.

Figure 1:
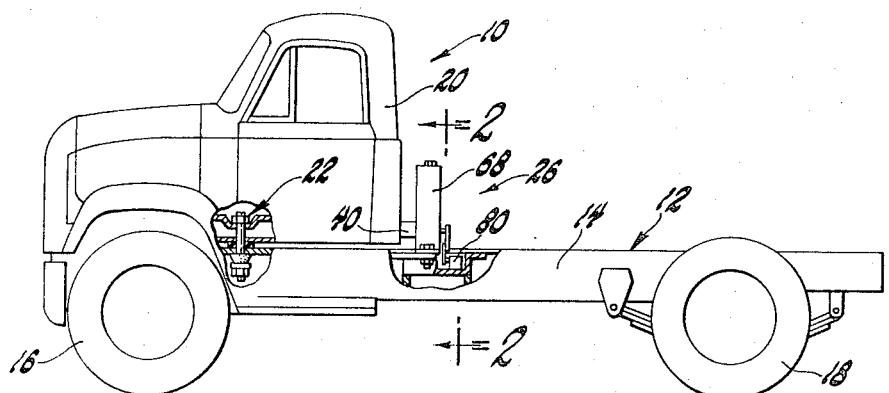
FIG. 1 is an elevational view showing a motor vehicle truck incorporating a cab mounting means made according to the invention.
Figure 2:
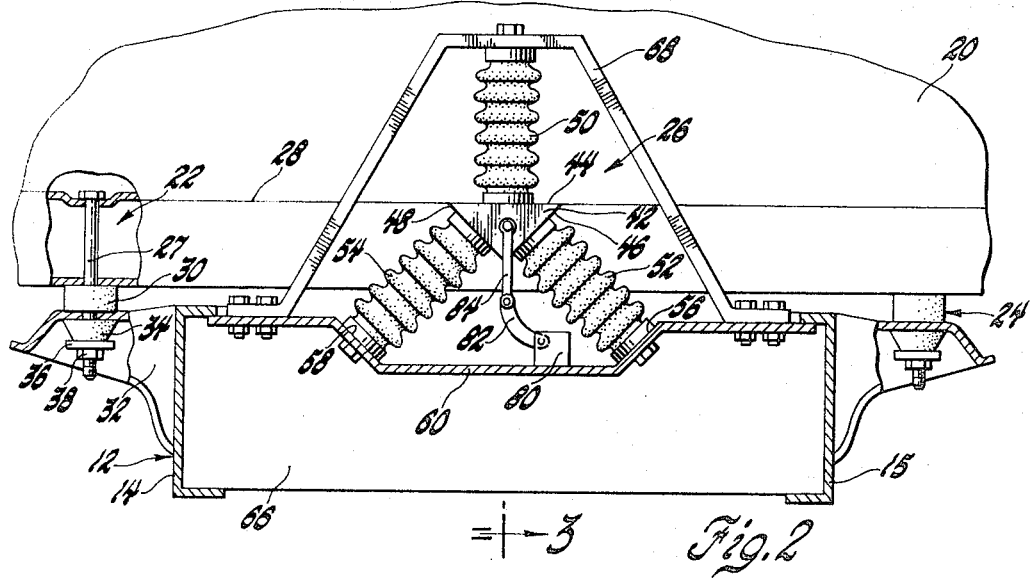
FIG. 2 is an enlarged view taken on lines 2—2 of FIG. 1.
Figure 3:
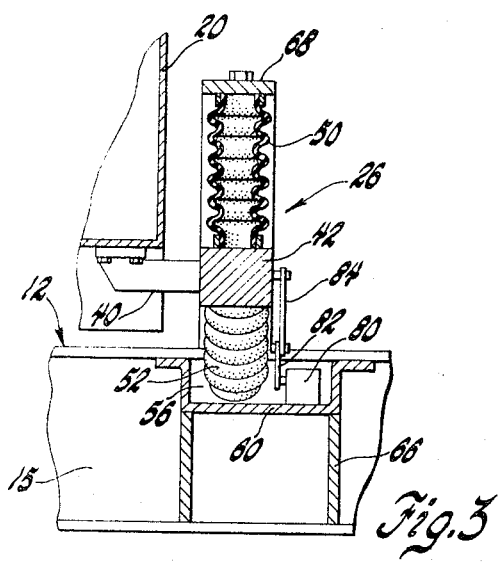
FIG. 3 is a sectional view taken on lines 3—3 of FIG. 2.
Figure 4:
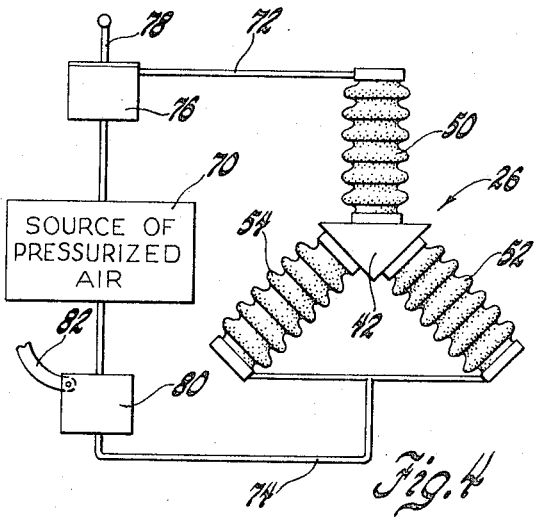

FIG. 4 schematically discloses the air system used with the mounting means of FIGS. 1–3.

Referring to the drawings and more particularly FIGS. 1 and 2 thereof, a motor vehicle truck 10 is shown comprising a chassis wich includes a frame 12 having parallel side rails 14 and 15 rigidly interconnected by a plurality of longitudinally spaced cross members. The front end of the frame 12 is supported by a pair of transversely spaced dirigible wheels 16 while the rear end is supported by a pair of transversely spaced driving wheels 18. A truck cab 20 is located at the forward end of the frame 12 and is supported thereon by a three point suspension which as seen in FIG. 2 includes a pair of transversely spaced front mounting assemblies 22 and 24 and a rear mounting device 26 made according to this invention. The three point suspension serves to resiliently connect the truck cab 20 to the frame 12 in a manner from the frame to the cab.

Each of the front mounting assemblies 22 and 24 is identical in construction and as seen in FIG. 2 includes a mounting bolt 27 which extends consecutively through the spaced sheet metal of the floor portion 28 of the cab, an upper elastomeric pad 30, a laterally extending frame bracket 32, and a lower elastomeric pad 34. A flat washer 36 and a lock nut 38 serve to maintain each front mounting assembly together for connecting the truck cab 20 to the frame 12. The arrangement of the parts of each front mounting assembly 22 and 24 is such that vertical movement of the cab 20 is cushioned by the upper and lower pads 30 and 34, and although not shown, it will be understood that each of the mounting bolts 27 extends through an enlarged aperture formed in the frame bracket 32 so that the cab 20 enjoys limited pivotal movement about a transverse horizontal axis passing through the front mounting assemblies.

The rear mounting device 26 serves to resiliently connect the rear end of the cab 20 to the frame 12 and, as seen in FIG. 2, is located midway between the frame side rails 14 and 15. As seen in FIGS. 2 and 3, the rear mounting device 26 comprises an L-shaped bracket 40 one end of which is rigidly bolted to the underside of the cab 20 while the other end extends rearwardly and is rigidly formed with a triangularly shaped block member 42 having angularly related flat outer surfaces 44, 46 and 48. The surfaces 44, 46, and 48 fixedly support the inner end of three identical bellows type air springs 50, 52 and 54 respectively. Each air spring extends radially outwardly relative to the block member 42 and has its longitudingal center axis spaced 120° from the longitudinal center axis of the other two air springs. The respective outer ends of air springs 52 and 54 are rigidly supported by inclined surfaces 56 and 58 which together with an interconnecting base section 60 define a well formed in a frame cross member 66 extending between side rails 14 and 15. The outer end of spring 50 is fixedly secured to the horizontal section of an inverted generally U-shaped bracket 68 the legs of which are bolted to the cross member 66. Thus, the air springs 50, 52 and 54 are confined between the bracket 40 including cross member 66 and bracket 68 and serve to cushion relative vertical as well as lateral movement between the rear end of the cab 20 and the frame 12.

As should be apparent, the cushioning effect of the rear mounting device 26 described above will depend upon the air pressure within the air springs 50, 52 and 54 and in this regard and as seen in FIG. 4, a source 70 of pressurized air is provided which is connected to the air spring 50 by an air hose 72 and is connected to the air springs 52 and 54 by an air hose 74. A conventional manually operable two-way valve 76 is located in the hose 72 between the air spring 50 and the source 70 and when a lever 78 is actuated in one direction, the valve 76 serves to direct the pressurized air from the source 70 to the air spring 50 to raise the air pressure therein. When the lever 78 is moved in the opposite direction, the air within the air spring 50 is exhausted via an outlet (not shown) connected to the valve 76 so as to lower the air pressure in the air spring 50. As should be apparent, the valve 76 can be located on the instrument panel in the cab 20 so it can be conveniently operated by the vehicle operator for inflating or deflating the air spring 50.

The air hose 74 has a conventional height control valve 80 interposed between the source 70 and the air springs 52 and 54. The height control valve 80 automatically maintains a constant cab height relative to the frame 12 by controlling the flow of pressurized air into and out of the air springs 52 and 54. Thus, as seen in FIGS. 2 and 3, the height control valve 80 is supported by the base section 60 and has a lever 82 which is connected by a link 84 to the block member 42. The lever has a neutral-center position wherein the valve 80 serves to trap the air in the air springs 52 and 54, an air-inlet position wherein the valve 80 causes air to flow from the source 70 to the air springs 52 and 54, and an air-exhaust position wherein the valve 80 causes air from the air springs 52 and 54 to be exhausted to atmosphere.

In operation, the air springs 50 and 52 support the cab 20 at a predetermined distance from the frame 12 through the height control valve 80 and together with air spring 50 serve to cushion vertical and lateral movement of the rear portion of the cab 20 relative to the frame 12. In order to change the ride characteristics provided by the mounting device 26, the vehicle operator may move the lever 78 of valve 76 in the proper direction to either exhaust air from or add air to the air spring 50. When pressurized air is added to the air spring 50, the block member 42 and, accordingly, the rear portion of the cab 20 will be urged downwardly towards the frame 12. The height control valve 80 will sense the movement through the connection provided by the link 84 and cause the lever 82 to be moved from the neutral-center position to the air-inlet position. As a result, pressurized air will flow into the air springs 52 and 54 to raise the air pressure therein until the block member 42 is returned to its original position. As should be apparent, an increase in air pressure in the springs 52 and 54 will increase the natural frequency of the mounting device 26 and result in a stiffer ride.

On the other hand, when air is exhausted from the air spring 50, the air springs 52 and 54 will tend to raise the block member 42 thereby causing the lever 82 of the height control valve 80 to be shifted to the air-exhaust position. This causes the air pressure in the air springs 52 and 54 to drop with a resultant lowering of the natural frequency of the mounting device 26 so that the rear portion of the cab 20 experiences a softer ride.

Thus, from the above, it should be clear that by raising or lowering the air pressure in the air spring 50, the vehicle operator is able to vary the spring rate and thereby adjust the ride characteristics provided by the mounting device 26. In addition, the inclination of springs 52 and 54 provide lateral control stability to the cab 20 with respect to the frame 14, while permitting a certain amount of relative movement to relieve body stresses encountered while traversing cross ditches or when jacking a wheel. Also, the height control valve 80 assures constant clearances between the bottom of the cab 20 and the frame 14 regardless of the number of occupants in the cab.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A mounting device for connecting a vehicle cab to a supporting vehicle frame and for cushioning relative movement therebetween, said mounting device comprising a first bracket member adapted to be rigidly secured to said vehicle cab, a second bracket member adapted to be rigidly connected to said vehicle frame adjacent the first bracket member, one of said bracket members being formed with a block member so when said first and second bracket members are secured to the vehicle cab and the vehicle frame at least one pair of opposed seating surfaces are provided above and below a horizontal axis passing through the block member, an air spring adapted to be located between each pair of opposed seating surfaces, a manually controlled valve adapted to connect the air springs located on one side of said horizontal axis to a source of pressurized air for selectively varying the air pressure therein, and a height control valve adapted to connect the air springs located on the other side of said horizontal axis to the source of pressurized air for maintaining the vehicle cab at a fixed height relative to the vehicle frame.

2. In a motor vehicle having a vehicle cab and a frame including a pair of laterally spaced side rails and a cross member interconnecting the side rails adjacent the rear end of the vehicle cab, a mounting device for connecting said rear end of the vehicle cab to said cross member and cushioning relative movement therebetween, said mounting device comprising a first bracket member rigidly secured to said vehicle cab, a second bracket member rigidly connected to said cross member adjacent the first bracket member, one of said bracket members being formed with a block member so when said first and second bracket members are secured to the vehicle cab and the cross member at least one pair of opposed seating surfaces are provided above and below a horizontal axis passing through the block member, an air spring located between each pair of opposed seating surfaces, a source of pressurized air, a manually controlled valve adapted to connect the air springs located on one side of said horizontal axis to said source of pressurized air for selectively vaying the air pressure therein, and a height control valve adapted to connect the air springs located on the other side of said horizontal axis to said source of pressurized air for normally maintaining the vehicle cab at a fixed height relative to the vehicle frame.

3. In a motor vehicle having a vehicle cab and a frame including a pair of laterally spaced side rails and a cross member interconnecting the side rails adjacent the rear end of the vehicle cab, a mounting device for connecting the rear end of the vehicle cab to said cross member and cushioning relative movement therebetween, said mounting device comprising a first bracket member ridigly secured to said vehicle cab and extending rearwardly therefrom, a second bracket member rigidly connected to said cross member adjacent the first bracket member, and together with said cross member providing three outer seating surfaces, said first bracket member being formed with a block member having three inner seating surfaces so when said first and second bracket members are secured to the vehicle cab and the cross member three pairs of circumferentially spaced opposed seating surfaces are provided, an air spring located between each pair of opposed seating surfaces a source of pressurized air, a manually controlled valve connecting one of the air springs to said source of pressurized air for selectively varying the air pressure therein, and a height control valve connecting the other of the air springs to the source of pressurized air for normally maintaining the vehicle cab at a fixed height relative to the vehicle frame.

\* \* \* \* \*

UNITED STATES PATENT OFFICE
CERTIFICATE OF CORRECTION

Patent No. 3,841,694        Dated October 15, 1974

Inventor(s) Ralph H. Merkle

It is certified that error appears in the above-identified patent and that said Letters Patent are hereby corrected as shown below:

Column 2, line 7, "wich" should be -- which --; same column, line 20, after "manner" insert -- so as to cushion shock loads and vibration transmitted --. Column 4, line 62 "vaying" should be -- varying --. Column 5, line 8, "ridigly" should be -- rigidly --.

Signed and sealed this 18th day of February 1975.

(SEAL)
Attest:
RUTH C. MASON
Attesting Officer

C. MARSHALL DANN
Commissioner of Patents
and Trademarks